US012601504B2

(12) United States Patent
Shinohara et al.

(10) Patent No.: US 12,601,504 B2
(45) Date of Patent: Apr. 14, 2026

(54) HEATING COOKING APPARATUS

(71) Applicant: SHARP KABUSHIKI KAISHA, Sakai City (JP)

(72) Inventors: Yu Shinohara, Sakai City (JP); Shinji Asami, Sakai City (JP); Masahiro Nishijima, Sakai City (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 390 days.

(21) Appl. No.: 18/270,539

(22) PCT Filed: Jan. 7, 2022

(86) PCT No.: PCT/JP2022/000354
§ 371 (c)(1),
(2) Date: Jun. 30, 2023

(87) PCT Pub. No.: WO2022/153942
PCT Pub. Date: Jul. 21, 2022

(65) Prior Publication Data

US 2024/0068671 A1 Feb. 29, 2024

(30) Foreign Application Priority Data

Jan. 12, 2021 (JP) ................................ 2021-002926

(51) Int. Cl.
*F24C 15/16* (2006.01)
*H05B 6/64* (2006.01)

(52) U.S. Cl.
CPC .......... *F24C 15/162* (2013.01); *F24C 15/168* (2013.01); *H05B 6/6414* (2013.01)

(58) Field of Classification Search
CPC .... F24C 15/168; F24C 15/022; F24C 15/162; H05B 6/6417; H05B 6/6414
See application file for complete search history.

(56) References Cited

U.S. PATENT DOCUMENTS 2,133,639 A * 10/1938 Smith .................. F24C 15/162 126/340
7,994,457 B2 8/2011 Yoshidome
(Continued)

FOREIGN PATENT DOCUMENTS

DE 2817514 A1 10/1979
JP 2008-309385 A 12/2008
(Continued)

*Primary Examiner* — Alfred Basichas
(74) *Attorney, Agent, or Firm* — ScienBiziP, P.C.

(57) ABSTRACT

A heating cooking apparatus includes a housing, a lid portion, a rail member, and a slide member. The housing includes an opening opened toward a first direction, and an outer peripheral portion disposed on an outer periphery of the opening. The lid portion includes a plate-like member that opens and closes the opening. The rail member is disposed in the housing and extends in the first direction. The slide member is disposed on the lid portion and extends from the lid portion in a direction opposite to the first direction. The slide member includes a main body portion that moves relative to the rail member and a protruding portion protruding upward from an end portion of the main body portion in the first direction side. The protruding portion is in contact with a first face of the plate-like member.

6 Claims, 11 Drawing Sheets

(56) References Cited

U.S. PATENT DOCUMENTS

| | | | | |
|---|---|---|---|---|
| 10,502,432 | B2 | 12/2019 | Zhou et al. | |
| 2005/0173426 | A1* | 8/2005 | Iwamoto | H05B 6/6402 219/403 |
| 2008/0307977 | A1 | 12/2008 | Yoshidome | |
| 2013/0017401 | A1* | 1/2013 | Rehage | B05D 5/083 427/299 |
| 2019/0215914 | A1* | 7/2019 | Zhou | H05B 6/6417 |
| 2022/0248901 | A1 | 8/2022 | Nishijima et al. | |

FOREIGN PATENT DOCUMENTS

| | | | |
|---|---|---|---|
| JP | 2011-089738 | A | 5/2011 |
| JP | 2011-112301 | A | 6/2011 |
| JP | 6692972 | B1 | 5/2020 |

* cited by examiner

HEATING COOKING APPARATUS

TECHNICAL FIELD

The present invention relates to a heating cooking apparatus.

BACKGROUND ART

PTL 1 discloses a heating cooking apparatus. The heating cooking apparatus disclosed in PTL 1 includes a heating cooking apparatus main body and a pull-out body. The heating cooking apparatus main body includes a heating cooking chamber.

The pull-out body can be pulled out toward the outside of the heating cooking apparatus main body in a state where the pull-out body is accommodated in the heating cooking chamber. The pull-out body includes a lid portion having a plate-like member. In a state where the pull-out body is drawn into the heating cooking chamber, the lid portion closes an opening on a front side of the heating cooking chamber.

CITATION LIST

Patent Literature

PTL 1: JP 2011-089738 A

SUMMARY OF INVENTION

Technical Problem

In the heating cooking apparatus disclosed in PTL 1, when the pull-out body is drawn into the heating cooking chamber, the plate-like member of the lid portion may be inclined. In other words, the plate-like member of the lid portion and an outer peripheral portion of the housing may not be maintained in parallel with each other.

In light of the above problem, an object of the present invention is to provide a heating cooking apparatus that can keep parallelism between the plate-like member of the lid portion and the outer peripheral portion of the housing with accuracy.

Solution to Problem

According to an aspect of the present invention, a heating cooking apparatus includes a housing, a lid portion, a rail member, and a slide member. The housing includes an opening opened toward a first direction and an outer peripheral portion disposed on an outer periphery of the opening. The lid portion includes a plate-like member that opens and closes the opening. The rail member is disposed in the housing and extends in the first direction. The slide member is disposed on the lid portion and extends from the lid portion in a direction opposite to the first direction. The plate-like member includes a first face disposed on a side of the first direction and a second face disposed on a side opposite to the first direction. The slide member includes a main body portion that moves relative to the rail member and a protruding portion that protrudes upward from an end portion of the main body portion on the side of the first direction. The protruding portion is in contact with the first face of the plate-like member.

Advantageous Effects of Invention

According to the heating cooking apparatus of the present invention, it is possible to keep parallelism between the plate-like member of the lid portion and the outer peripheral portion of the housing with accuracy.

DESCRIPTION OF EMBODIMENTS

Figure 1:
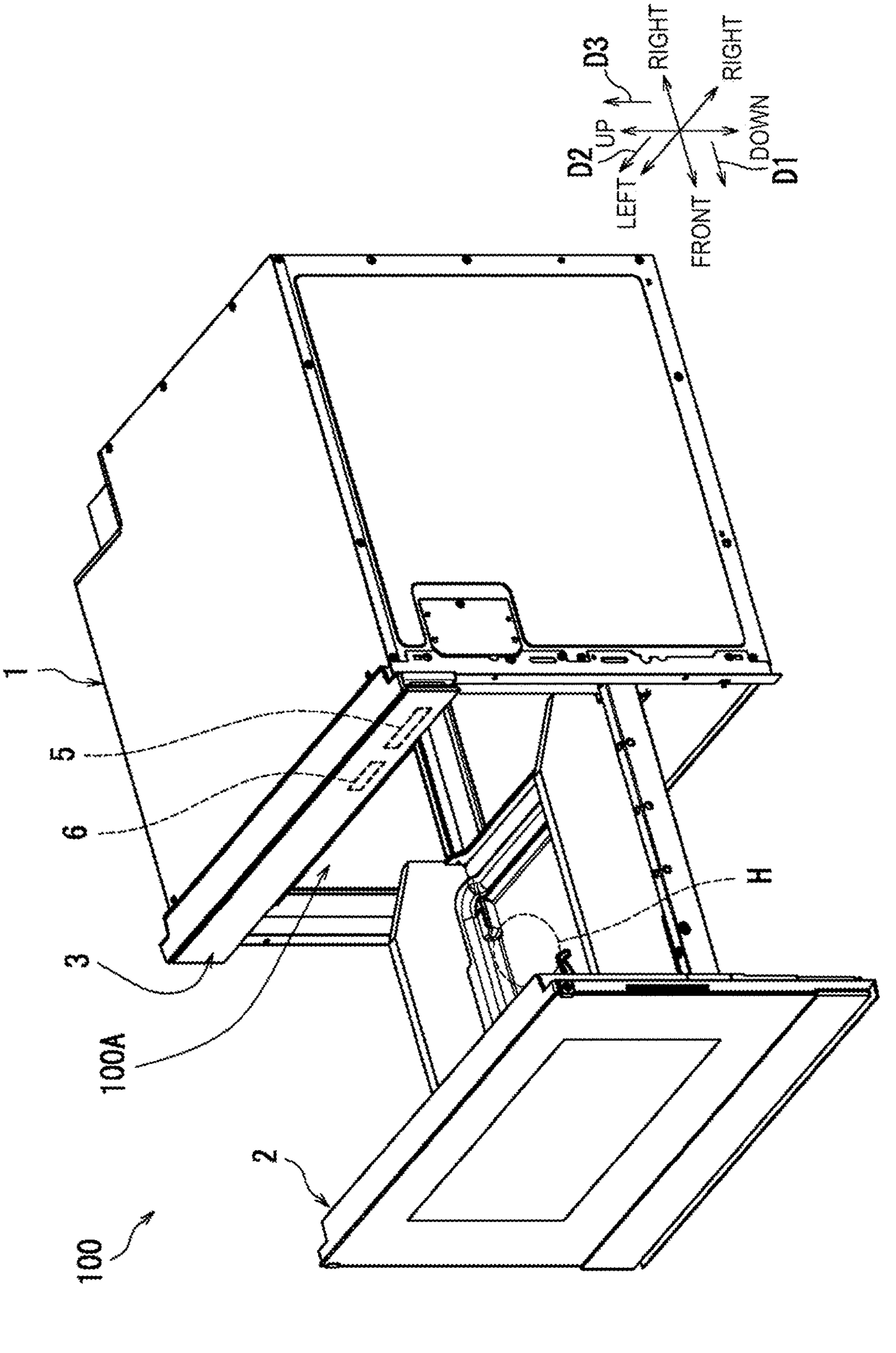
FIG. 1 is a perspective view illustrating a pull-out type heating cooking apparatus according to an embodiment of the present invention.

Hereinafter, embodiments of a pull-out type heating cooking apparatus according to the present invention will be described with reference to the drawings. Note that, in the drawings, the same or equivalent components are denoted by the same reference numerals and signs, and description thereof will not be repeated.

Figure 2:
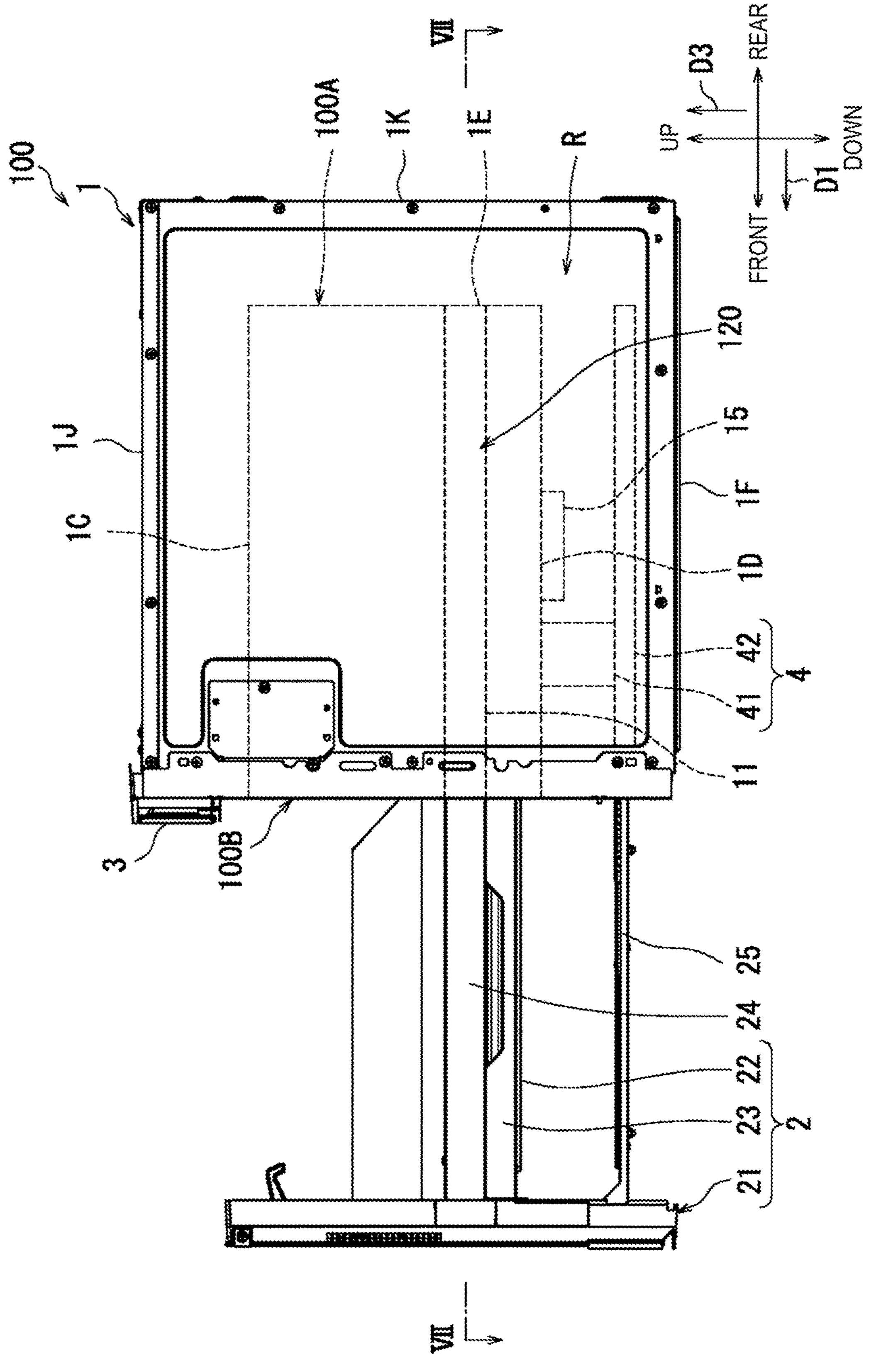
FIG. 2 is a right side view illustrating the pull-out type heating cooking apparatus according to the present embodiment.
Figure 3:
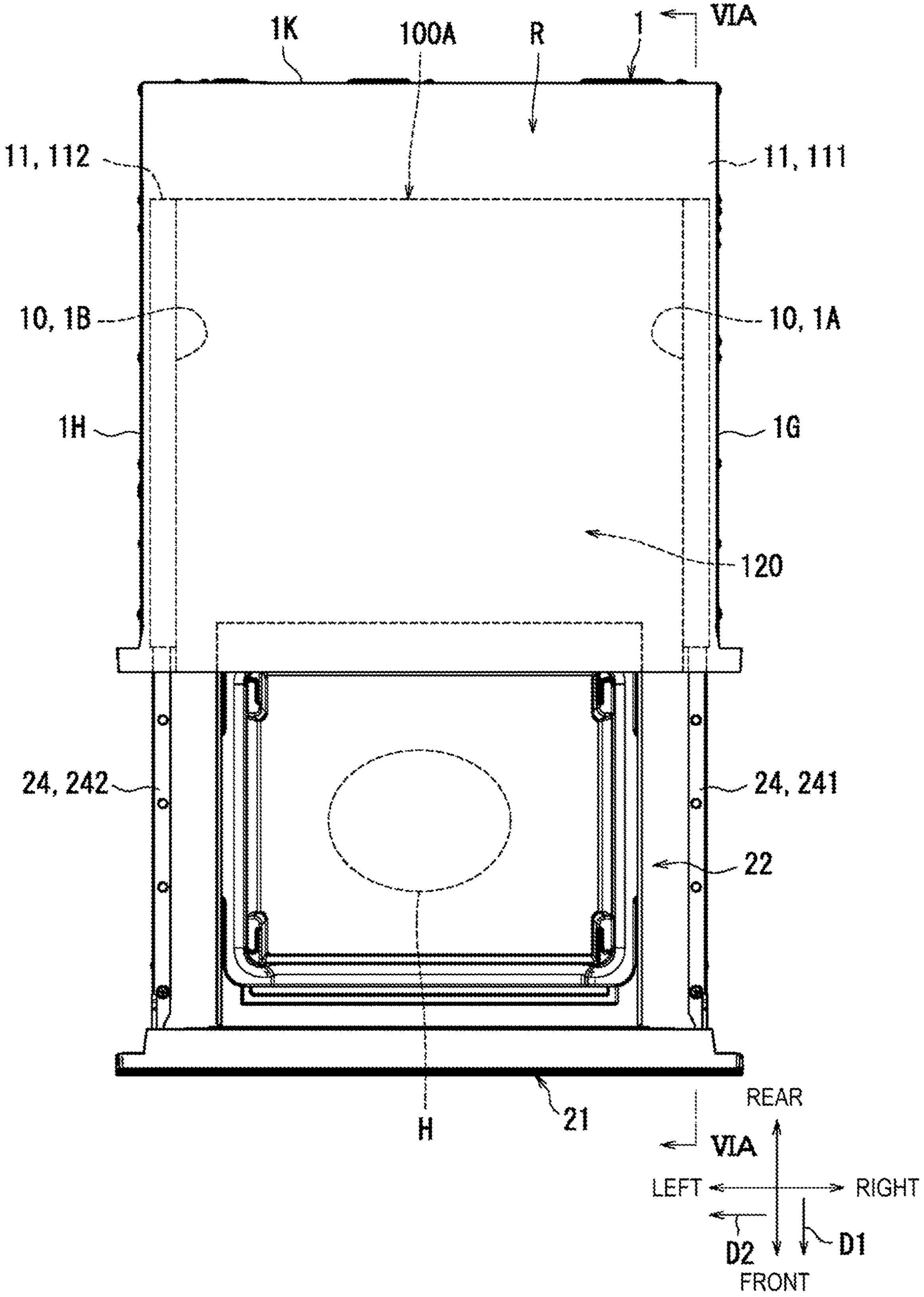
FIG. 3 is a top view illustrating the pull-out type heating cooking apparatus according to the present embodiment.

A pull-out type heating cooking apparatus 100 according to the present embodiment will be described with reference to FIG. 1 to FIG. 3. FIG. 1 is a perspective view illustrating the pull-out type heating cooking apparatus 100. FIG. 2 is a right side view illustrating the pull-out type heating cooking apparatus 100. FIG. 3 is a top view illustrating the pull-out type heating cooking apparatus 100. More specifically, FIG. 1 to FIG. 3 illustrate the pull-out type heating cooking apparatus 100 in a state where a pull-out body 2 is pulled out. Further, FIG. 1 illustrates an external appearance of the pull-out type heating cooking apparatus 100 as viewed diagonally from the upper front right. The pull-out type heating cooking apparatus 100 is an example of a heating cooking apparatus.

As illustrated in FIG. 1, the pull-out type heating cooking apparatus 100 heats and cooks an object H to be heated. The object H to be heated is, for example, a food product. The pull-out type heating cooking apparatus 100 includes a heating chamber 1, the pull-out body 2, an operation panel 3, and a heating cooking chamber 100A. The heating chamber 1 is an example of "housing".

In the present embodiment, a side at which the operation panel 3 of the pull-out type heating cooking apparatus 100 is disposed is defined as a front side of the pull-out type heating cooking apparatus 100, and a side opposite to the front side (rear face side) is defined as a rear side of the pull-out type heating cooking apparatus 100. Further, a right side when the pull-out type heating cooking apparatus 100 is viewed from the front side is defined as a right side of the pull-out type heating cooking apparatus 100, and a side opposite to the right side is defined as a left side of the pull-out type heating cooking apparatus 100. Further, in a direction orthogonal to a front-rear direction and a left-right direction of the pull-out type heating cooking apparatus 100, a side at which the operation panel 3 is disposed is defined as an upper side of the pull-out type heating cooking apparatus 100, and a side opposite to the upper side (bottom side) is defined as a lower side of the pull-out type heating cooking apparatus 100. Note that these orientations do not limit an orientation of the pull-out type heating cooking apparatus 100 according to the present invention in use.

As illustrated in FIG. 1 to FIG. 3, the heating chamber 1 is a box-like member. Specifically, the heating chamber 1 includes a right outer wall 1G, a left outer wall 1H, a top outer wall 1J, a bottom outer wall 1F, and a back outer wall 1K. The heating chamber 1 accommodates the heating cooking chamber 100A.

The pull-out body 2 can be pulled out in a first direction D1 from the heating cooking chamber 100A. The first direction D1 is the forward direction. A third direction D3 intersects the first direction D1. In the present embodiment, the third direction D3 is orthogonal to the first direction D1. In the present embodiment, the third direction D3 is the upward direction. Specifically, the pull-out body 2 includes a lid portion 21, a placing portion 22, and a support portion 23.

The heating cooking chamber 100A includes a placement space 120 that accommodates the object H to be heated. The shape of the heating cooking chamber 100A is, for example, a substantially rectangular parallelepiped shape. Specifically, the heating cooking chamber 100A includes a pair of side wall portions 10, a back wall 1E, and an opening portion 100B. The opening portion 100B is an example of an "opening". The back wall 1E intersects the first direction D1. The opening portion 100B faces the back wall 1E. The opening portion 100B opens toward the first direction D1. The opening portion 100B communicates with the outside of the heating cooking chamber 100A. The pair of side wall portions 10 face each other in a second direction D2. The second direction D2 is the left direction. Specifically, the pair of side wall portions 10 includes a right wall 1A and a left wall 1. The heating cooking chamber 100A further includes a top wall 1C and a bottom wall 1D. Materials of the right wall 1A, the left wall 1*i*, the top wall 1C, the bottom wall 1D, and the back wall 1E are, for example, a metal.

The heating chamber 1 further includes a space R between the heating chamber 1 and the heating cooking chamber 100A. Specifically, the heating chamber 1 further includes the space R between the bottom wall 1D and the bottom outer wall 1F. The heating chamber 1 further includes the space R between the right wall 1A and the right outer wall 1G. The heating chamber 1 further includes the space R between the left wall 1B and the left outer wall 1H. The heating chamber 1 further includes the space R between the top wall 1C and the top outer wall 1J. The heating chamber 1 further includes the space R between the back wall 1E and the back outer wall 1K.

As illustrated in FIG. 3, the pull-out type heating cooking apparatus 100 further includes a pair of rail members 11. Specifically, one rail member of the pair of rail members 11 includes a right side rail member 111, and the other rail member of the pair of rail members 11 includes a left side rail member 112. The right side rail member 111 and the left side rail member 112 face each other in the left-right direction.

Each of the right side rail member 111 and the left side rail member 112 is disposed in the heating chamber 1. Specifically, each of the right side rail member 111 and the left side rail member 112 is disposed between the heating chamber 1 and the heating cooking chamber 100A. More specifically, the right side rail member 111 is fixed on the right wall 1A in the space R between the right wall 1A and the right outer wall 1G. The left side rail member 112 is fixed on the left wall 1B in the space R between the left wall 1B and the left outer wall 1H. Particularly, each of the right side rail member 111 and the left side rail member 112 extends in the first direction D1.

Meanwhile, the pull-out type heating cooking apparatus 100 further includes a pair of slide members 24. Specifically, one slide member of the pair of slide members 24 includes a right side slide member 241, and the other slide member of the pair of slide members 24 includes a left side slide member 242. The right side slide member 241 and the left side slide member 242 face each other in the left-right direction.

Each of the right side slide member 241 and the left side slide member 242 is disposed on the lid portion 21. Specifically, one end portion of the right side slide member 241 is attached to a right edge portion of the lid portion 21. One end portion of the left side slide member 242 is attached to a left edge portion of the lid portion 21. Particularly, each of the right side slide member 241 and the left side slide member 242 extends in a direction opposite to the first direction D1 from the lid portion 21.

The right side slide member 241 is slidably supported by the right side rail member 111. The left side slide member 242 is slidably supported by the left side rail member 112. In other words, each of the right side slide member 241 and the left side slide member 242 is disposed between the heating chamber 1 and the heating cooking chamber 100A.

As illustrated in FIG. 2, the pull-out type heating cooking apparatus 100 further includes a support member 25. The support member 25 supports the lid portion 21. One end portion of the support member 25 is attached at a center portion in the left-right direction of the lid portion 21 and below the placing portion 22. The support member 25 is a plate-like member extending in a direction opposite to the first direction D1 from the lid portion 21. The support member 25 includes a rack portion. The rack portion includes teeth. The support member 25 may be a single plate-like member or a plurality of plate-like members.

Meanwhile, the pull-out type heating cooking apparatus 100 further includes a drive mechanism 4. The drive mechanism 4 drives the support member 25. The drive mechanism 4 is positioned below the heating cooking chamber 100A. Specifically, the drive mechanism 4 is accommodated in the space R between the bottom wall 1D and the bottom outer wall 1F. For example, the drive mechanism 4 includes a drive motor 41, a pinion, and a drive rail 42. The drive rail 42 is fixed in the space R between the bottom wall 1D and the bottom outer wall 1F. The drive rail 42 is a member having the front-rear direction as a longitudinal direction.

The support member 25 is slidably supported by the drive rail 42. The pinion is attached to an endmost portion of the drive motor 41.

The pinion engages with the rack portion of the support member 25. Furthermore, the support member 25 moves in the front-rear direction as a result of rotation of the pinion. Note that the drive mechanism 4 may drive at least one of the support member 25, and the right side slide member 241 and the left side slide member 242. Furthermore, in a case where the right side slide member 241 and the left side slide member 242 are driven, the drive mechanism 4 may be positioned more on the side than the heating cooking chamber 100A.

The pull-out type heating cooking apparatus 100 further includes a microwave supply unit 15. The microwave supply unit 15 supplies microwaves into the heating cooking chamber 100A. Specifically, the microwave supply unit 15 includes a radiation chamber, a magnetron, a waveguide, a rotating antenna, and an antenna motor. The magnetron generates microwaves. The waveguide propagates the microwaves generated by the magnetron to the radiation chamber. The rotating antenna is accommodated in the radiation chamber. The antenna motor drives the rotating antenna. The rotating antenna stirs the microwaves and supplies the microwaves into the heating cooking chamber 100A.

As illustrated in FIG. 1, the operation panel 3 receives an operation from a user. The operation includes, for example, a cooking method for heating and cooking the object H to be heated, or information about movement of the lid portion 21 between the closed position and the open position thereof. Specifically, the operation panel 3 includes a display unit, a storage unit 6, and a control unit 5. The display unit displays various pieces of information. Specifically, the display unit includes a liquid crystal panel.

The storage unit 6 is constituted by a random access memory (RAM) and a read only memory (ROM). The storage unit 6 stores a control program for controlling an operation of each unit of the pull-out type heating cooking apparatus 100. The storage unit 6 stores setting information input by operating the display unit.

The control unit 5 is a hardware circuit that includes a processor such as a central processing unit (CPU). The control unit 5 executes the control program stored in the storage unit 6.

Figure 4:
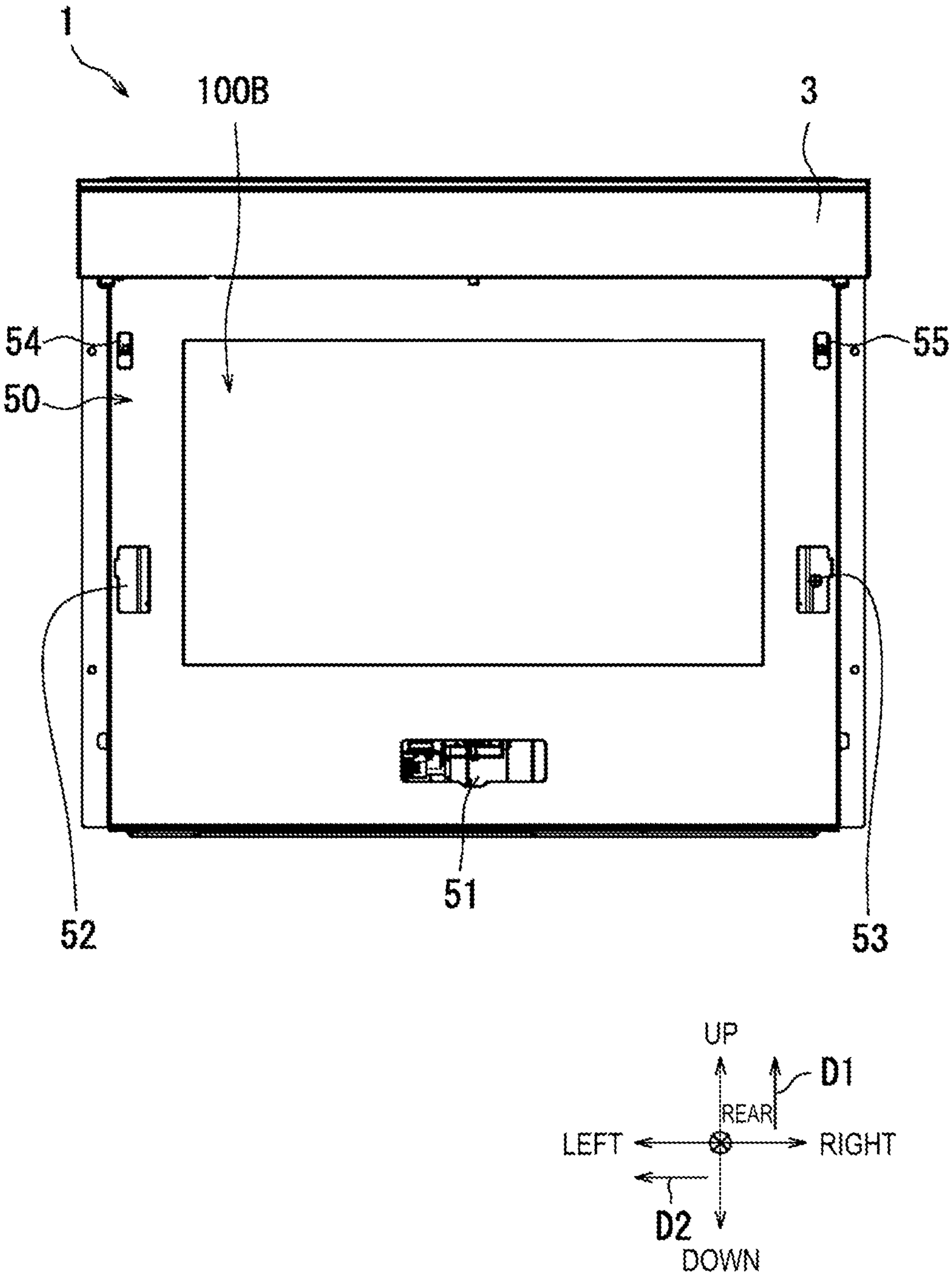
FIG. 4 is a front view of the pull-out type heating cooking apparatus according to the present embodiment.

Next, a panel 50 will be further described with reference to FIG. 4. FIG. 4 is a front view of the pull-out type heating cooking apparatus 100. Particularly, FIG. 4 is a front view of the pull-out type heating cooking apparatus 100 in a state where the pull-out body 2 is pulled out. As illustrated in FIG. 4, the pull-out type heating cooking apparatus 100 further includes the panel 50. The panel 50 is an example of an "outer peripheral portion".

The panel 50 is disposed on the outer periphery of the opening portion 100B. The opening portion 100B has, for example, a rectangular shape. The panel 50 is, for example, a plate-like member having a rectangular annular shape. The panel 50 includes a first through hole 51, a second through hole 52, a third through hole 53, a fourth through hole 54, and a fifth through hole 55.

The first through hole 51, the second through hole 52, the third through hole 53, the fourth through hole 54, and the fifth through hole 55 are formed around the opening portion 100B. Particularly, the first through hole 51 is formed at a position on a lower side of the opening portion 100B. The second through hole 52 is formed at a position on a left side of the opening portion 100B. The third through hole 53 is formed at a position on a right side of the opening portion 100B. The fourth through hole 54 is formed at a position on the left side of the opening portion 100B and on an upper side of the second through hole 52. The fifth through hole 55 is formed at a position on the right side of the opening portion 100B and on an upper side of the third through hole 53.

Figure 5:
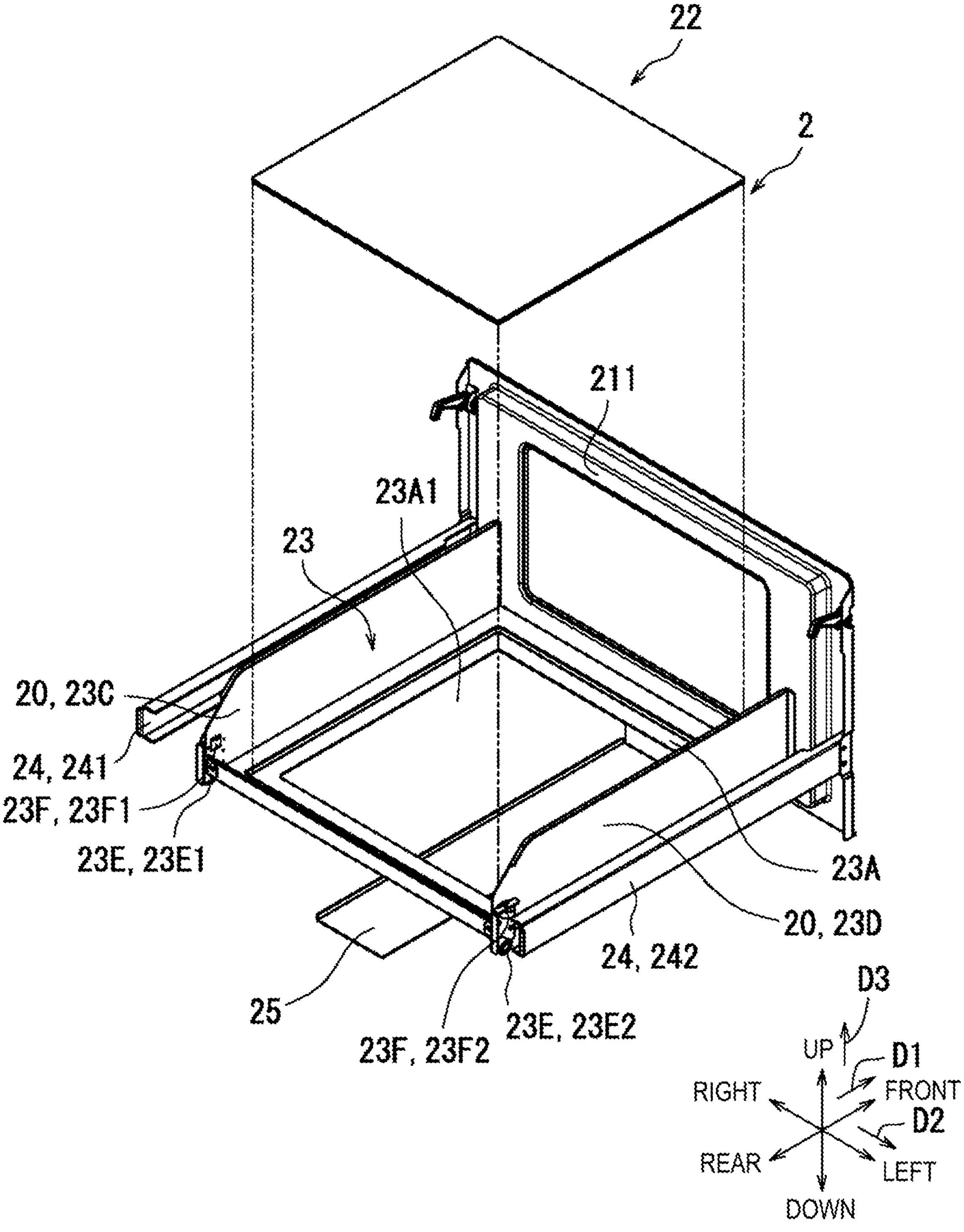
FIG. 5 is an exploded perspective view illustrating a pull-out body according to the present embodiment.
Figure 6A:
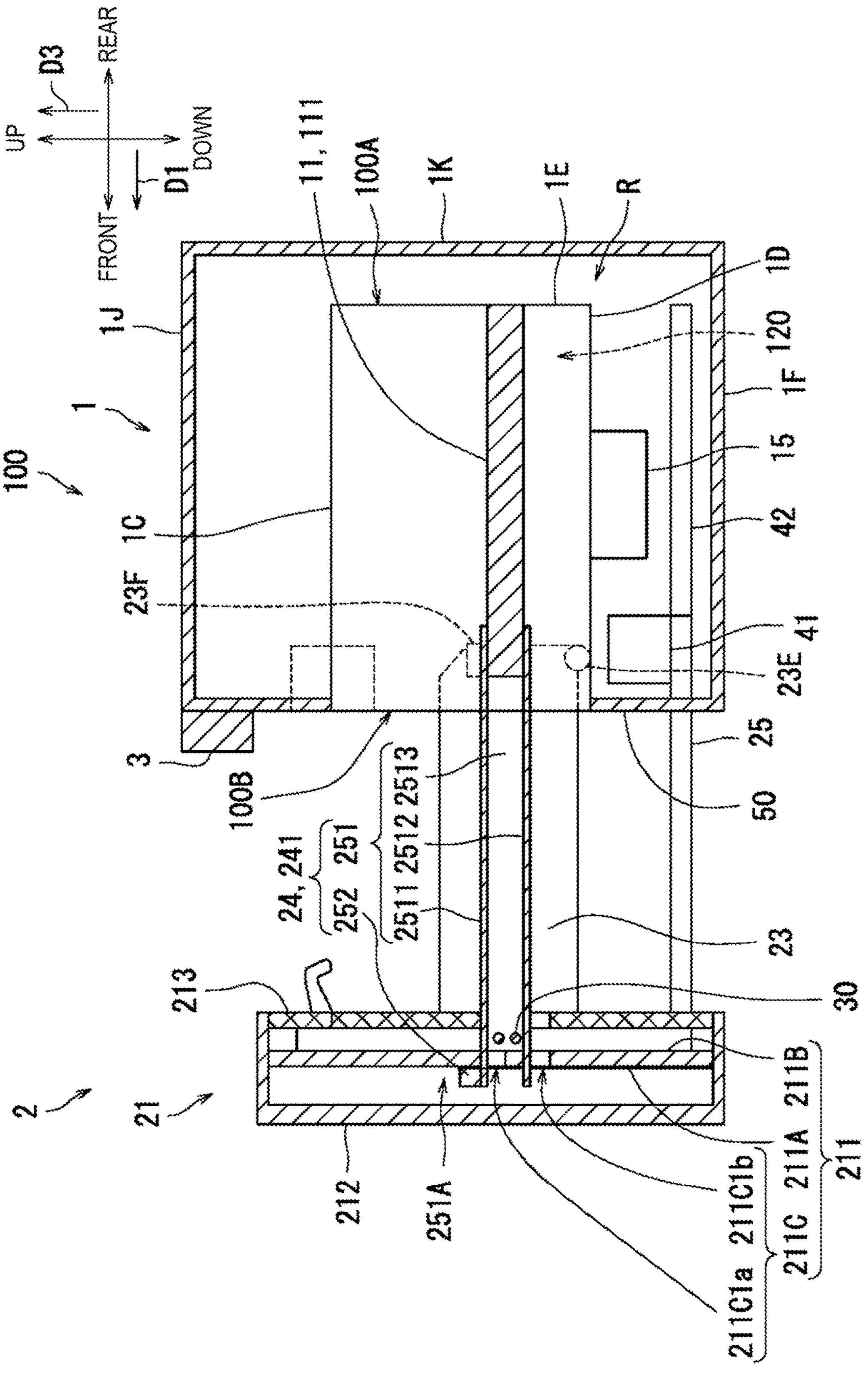
FIG. 6A is a cross-sectional view of the heating cooking apparatus taken along line VIA in FIG. 3.
Figure 6B:
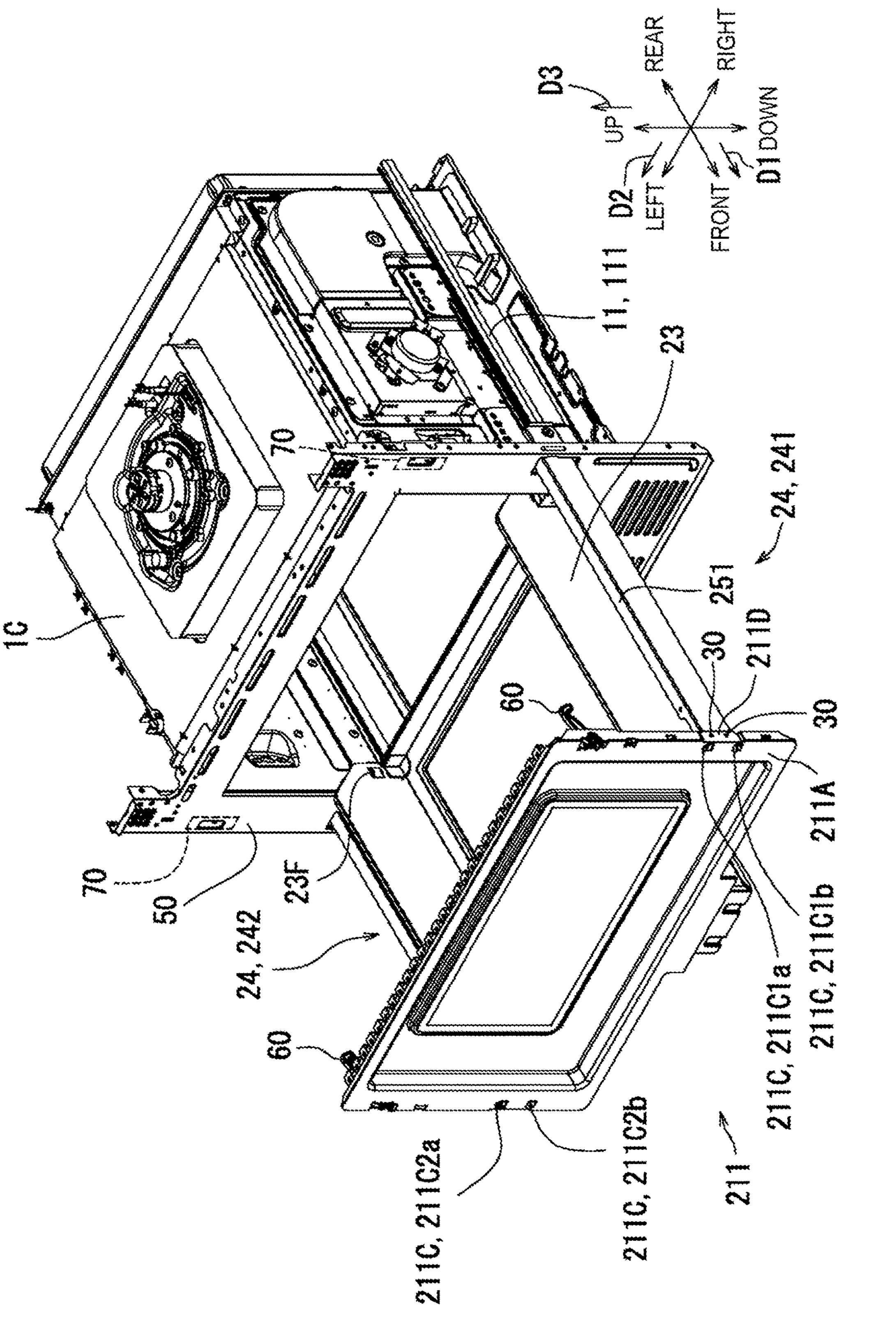
FIG. 6B is a perspective view illustrating the pull-out type heating cooking apparatus according to the present embodiment.

Next, the pull-out body 2 will be described in detail with reference to FIG. 5 to FIG. 6B. FIG. 5 is an exploded perspective view illustrating the pull-out body 2 according to the present embodiment. FIG. 6A is a cross-sectional view of the pull-out type heating cooking apparatus 100 taken along line VIA in FIG. 3. FIG. 6B is a perspective view illustrating the pull-out type heating cooking apparatus 100. Particularly, FIG. 5 and FIG. 6B are perspective views of the pull-out type heating cooking apparatus 100 in a state where the heating chamber 1, a first cover member 212, and a second cover member 213 are removed. As illustrated in FIG. 5 to FIG. 6B, the lid portion 21 includes a plate-like member 211, the first cover member 212, and the second cover member 213.

The plate-like member 211 includes a first face 211A and a second face 211B. The first face 211A is disposed on the first direction D1 side. The second face 211B is disposed on a side opposite to the first direction D1. The material of the plate-like member 211 is, for example, a metal. Note that a recess may be provided in a center portion of the plate-like member 211, and a window may be disposed in the recess.

The plate-like member 211 opens and closes the opening portion 100B of the heating cooking chamber 100A. Specifically, the plate-like member 211 moves between a closed position and an open position. The open position indicates a position where the plate-like member 211 opens the opening portion 100B. On the other hand, the closed position indicates a position where the panel 50 and the second face 211B face each other. More particularly, the closed position indicates a position where a distance between the panel 50 and the second face 211B is a predetermined distance, or a position where the panel 50 and the second face 211B are in contact with each other. The predetermined distance is, for example, 0.5 mm. The position where the panel 50 and the second face 211B are in contact with each other is, for example, a position where the panel 50 and the second face 211B are in close contact with each other.

The first cover member 212 covers the entire first face 211A. Particularly, the first cover member 212 is positioned outside the heating cooking chamber 100A in a case where the plate-like member 211 is positioned at the closed position. The material of the first cover member 212 is synthetic resin. The synthetic resin includes, for example, polybutylene terephthalate.

The second cover member 213 covers a peripheral edge portion of the second face 211B. The material of the second cover member 213 is synthetic resin. The synthetic resin includes, for example, polybutylene terephthalate.

The object H to be heated can be placed on the placing portion 22. Specifically, the placing portion 22 has a placing surface on which the object H to be heated is placed. The material of the placing portion 22 is a non-metal, and is preferably ceramic or glass, for example. As a result, the placing portion 22 transmits microwaves.

The support portion 23 is fixed to the second face 211B of the lid portion 21 and supports the peripheral edge portion of the placing portion 22 such that the placing portion 22 is held in a horizontal state. Specifically, the support portion 23 includes a bottom plate portion 23A and a pair of wall portions 20. The material of the support portion 23 is, for example, a metal.

The bottom plate portion 23A includes a rectangular opening 23A1. The rectangular opening 23A1 is positioned at substantially a center portion of the bottom plate portion 23A.

One wall portion of the pair of wall portions 20 includes a right side plate portion 23C, and the other wall portion of the pair of wall portions 20 includes a left side plate portion 23D. Each of the right side plate portion 23C and the left side plate portion 23D extends along the first direction D1. The right side plate portion 23C and the left side plate portion 23D face each other in the left-right direction. Particularly, the right side plate portion 23C and the left side plate portion 23D extend upward from the peripheral edge portion of the bottom plate portion 23A. The placing portion 22 is fitted among the lid portion 21, the right side plate portion 23C, and the left side plate portion 23D. The peripheral edge portion of the placing portion 22 is fixed to an upper surface of the peripheral edge portion of the bottom plate portion 23A.

The support portion 23 further includes a pair of rollers 23E and a pair of rollers 23F. The pair of rollers 23E and the pair of rollers 23F rotate as the pull-out body 2 moves. Specifically, one roller of the pair of rollers 23E includes a right side roller 23E1, and the other roller of the pair of rollers 23E includes a left side roller 23E2. The right side roller 23E1 and the left side roller 23E2 rotate about a rotation axis along the second direction D2. In addition, the right side roller 23E1 is attached to a rear end portion of the right side plate portion 23C. The left side roller 23E2 is attached to a rear end portion of the left side plate portion 23D. The right side roller 23E1 and the left side roller 23E2 are in contact with the bottom wall 1D.

Also, one roller of the pair of rollers 23F includes a right side roller 23F1, and the other roller of the pair of rollers 23F includes a left side roller 23F2. The right side roller 23F1 and the left side roller 23F2 rotate about a rotation axis along the third direction D3. The right side roller 23F1 is attached to a rear end portion of the right side plate portion 23C. The left side roller 23F2 is attached to a rear end portion of the left side plate portion 23D. The right side roller 23F1 is in contact with the right wall 1A. The left side roller 23F2 is in contact with the left wall 1B.

The placing portion 22 and the support portion 23 are accommodated in the heating cooking chamber 100A when the plate-like member 211 is positioned at the closed position. On the other hand, when the plate-like member 211 is positioned at the open position, the placing portion 22 and the support portion 23 are pulled out from the heating cooking chamber 100A, in a state where the pair of rollers 23E and the pair of rollers 23F are accommodated in the heating cooking chamber 100A.

Here, the right side slide member 241 will be described in detail with reference to FIG. 6A and FIG. 6B. The right side slide member 241 includes a main body portion 251 and a protruding portion 252. The material of the right side slide member 241 is, for example, a metal.

The main body portion 251 moves relative to the right side rail member 111. Specifically, the main body portion 251 includes an upper plate 2511, a lower plate 2512, and a side plate 2513. The upper plate 2511 and the lower plate 2512 face each other in the up-down direction. The side plate 2513 connects the upper plate 2511 and the lower plate 2512. The right side rail member 111 is inserted between the upper plate 2511 and the lower plate 2512.

The protruding portion 252 protrudes upward from an end portion 251A of the main body portion 251 on the first direction D1 side. Particularly, the protruding portion 252 protrudes upward from the end portion 251A of the upper plate 2511 on the first direction D1 side. Specifically, the protruding portion 252 includes a plate-like member. The protruding portion 252 is disposed perpendicularly to the first direction D1. The protruding portion 252 comes into contact with the first face 211A of the plate-like member 211 of the lid portion 21.

According to the pull-out type heating cooking apparatus 100, when the lid portion 21 moves from the open position to the closed position, the plate-like member 211 moves toward a direction opposite to the first direction D1 in a state where the protruding portion 252 is in contact with the first face 211A of the plate-like member 211. Accordingly, the protruding portion 252 can restrict inclination of the plate-like member 211. In other words, when the lid portion 21 is moved from the open position to the closed position, it is possible to keep the parallelism between the plate-like member 211 of the lid portion 21 and the panel 50 of the heating chamber 1 with accuracy. As a result, in a case where the lid portion 21 is positioned at the closed position, it is possible to keep the parallelism between the plate-like member 211 of the lid portion 21 and the panel 50 of the heating chamber 1 with accuracy.

In addition, the left side slide member 242 has a configuration similar to that of the right side slide member 241. As a result, in a case where the lid portion 21 is positioned at the closed position, it is possible to keep the parallelism between the plate-like member 211 of the lid portion 21 and the panel 50 of the heating chamber 1 with higher accuracy.

The pull-out type heating cooking apparatus 100 further includes the microwave supply unit 15. As a result, it is possible to suppress leakage of microwaves from the inside of the heating cooking chamber 100A.

In addition, each of the right side slide member 241 and the left side slide member 242 is disposed between the heating chamber 1 and the heating cooking chamber 100A. As a result, it is possible to prevent each of the right side slide member 241 and the left side slide member 242 from being heated to a high temperature.

Figure 7:
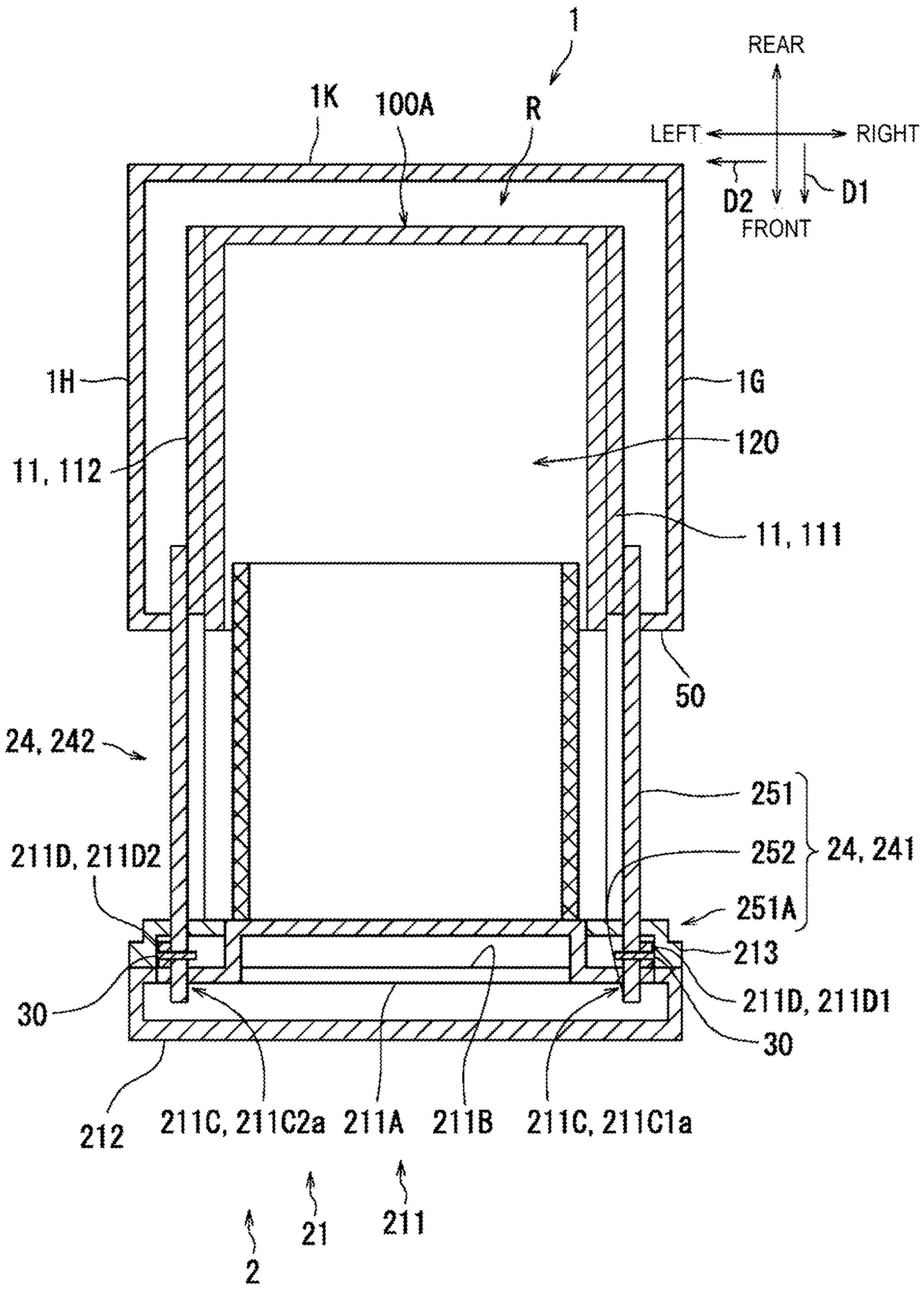
FIG. 7 is a cross-sectional view of the heating cooking apparatus taken along line VII in FIG. 2.

Next, a fixing method for fixing the lid portion 21 and the slide member 24 will be described in detail with reference to FIG. 6A to FIG. 7. FIG. 7 is a cross-sectional view of the pull-out type heating cooking apparatus 100 taken along line VII in FIG. 2. As illustrated in FIG. 6A to FIG. 7, the plate-like member 211 has a pair of through holes 211C. Each of the pair of through holes 211C penetrates along the first direction D1.

Specifically, one through hole of the pair of through holes 211C includes an upper right side through hole 211C1*a* and a lower right side through hole 211C1*b*, and the other through hole of the pair of through holes 211C includes an upper left side through hole 211C2*a* and a lower left side through hole 211C2*b*.

The end portion 251A of the main body portion 251 on the first direction D1 side is inserted into the through hole 211C. Specifically, the end portion 251A of the upper plate 2511 of the right side slide member 241 on the first direction side is inserted into the upper right side through hole 211C1*a*. The end portion 251A of the lower plate 2512 of the right side slide member 241 on the first direction side is inserted into the lower right side through hole 211C1*b*. The end portion 251A of the upper plate 2511 of the left side slide member 242 on the first direction D1 side is inserted into the upper left side through hole 211C2*a*. The end portion 251A of the lower plate 2512 of the left side slide member 242 on the first direction D1 side is inserted into the lower left side through hole 211C2*b*. As a result, when the through holes 211C are formed at desired positions in the plate-like member 211, the slide member 24 can be fixed to the through holes 211C formed at the desired positions in the plate-like member 211. Furthermore, the lid portion 21 and the slide member 24 can be easily fixed to each other.

Particularly, the through holes 211C are disposed in the plate-like member 211 such that the weight of the lid portion 21 above the through holes 211C is substantially equal to the weight of the lid portion 21 below the through holes 211C. As a result, the protruding portion 252 can further restrict inclination of the plate-like member 211. Thus, it is possible to keep the parallelism between the plate-like member 211 of the lid portion 21 and the panel 50 of the heating chamber 1 with higher accuracy.

More particularly, the plate-like member 211 further includes a pair of extension portions 211D. Each of the pair of extension portions 211D extends from the second face 211B in a direction opposite to the first direction D1. Specifically, each of the pair of extension portions 211D is a plate-like member.

Specifically, one extension portion of the pair of extension portions 211D includes a right side extension portion 211D1, and the other extension portion of the pair of extension portions 211D includes a left side extension portion 211D2. The right side extension portion 211D1 is disposed at a peripheral edge portion of the right side through holes 211C1. The left side extension portion 211D2 is disposed at a peripheral edge portion of the left side through holes 211C2.

Meanwhile, the pull-out type heating cooking apparatus 100 further includes a plurality of fixing members 30. Each of the plurality of fixing members 30 extends in the second direction D2. The plurality of fixing members 30 fix the end portions 251A on the first direction D1 side of the main body portion 251 and the extension portions 211D.

Specifically, two fixing members 30 among the plurality of fixing members 30 fix the end portion 251A of the side plate 2513 of the right side slide member 241 on the first direction D1 side and the right side extension portion 211D1. In addition, two fixing members 30 among the plurality of fixing members 30 fix the end portion 251A of the side plate 2513 of the left side slide member 242 on the first direction D1 side and the left side extension portion 211D2. As a result, the plurality of fixing members 30 can restrict inclination of the plate-like member 211. Thus, it is possible to keep the parallelism between the plate-like member 211 of the lid portion 21 and the panel 50 of the heating chamber 1 with higher accuracy.

Note that each of the plurality of fixing members 30 is preferably a screw. As a result, it is possible to easily fix the end portions 251A of the main body portion 251 on the first direction D1 side and the extension portions 211D to each other. In addition, a shape of the through hole of the right side extension portion 211D1 into which at least one fixing member 30 of the two fixing members 30 is inserted may be an elliptical shape. As a result, when the side plate 2513 of the right side slide member 241 and the right side extension portion 211D1 are fixed to each other, it is possible to adjust inclination of the plate-like member 211 with respect to the right side slide member 241. Furthermore, a shape of the through hole of the left side extension portion 211D2 into which at least one fixing member 30 of the two fixing members 30 is inserted may be an elliptical shape. As a result, when the side plate 2513 of the left side slide member 242 and the left side extension portion 211D2 are fixed to each other, it is possible to adjust inclination of the plate-like member 211 with respect to the left side slide member 242.

Figure 8:
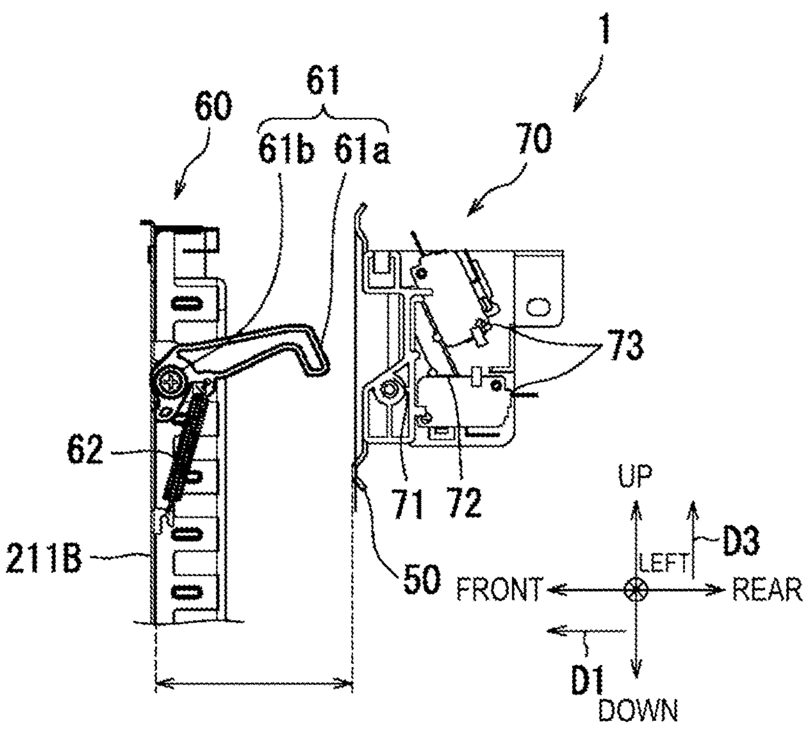
FIG. 8 is a cross-sectional view illustrating a connecting member and a connected member according to the present embodiment.
Figure 9:
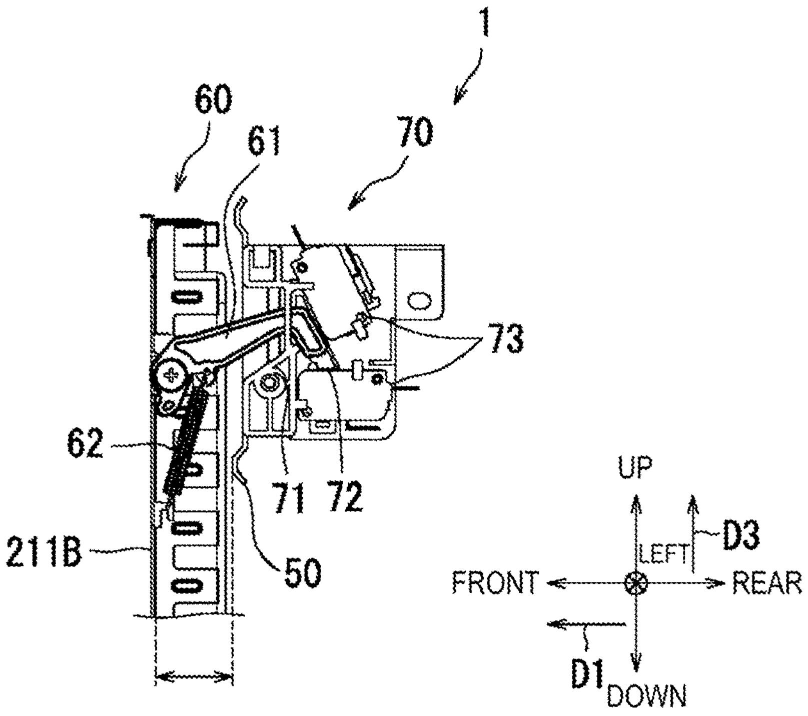
FIG. 9 is a cross-sectional view illustrating the connecting member and the connected member according to the present embodiment.

Next, a connecting member 60 and a connected member 70 will be described with reference to FIG. 6B, FIG. 8, and FIG. 9. FIG. 8 and FIG. 9 are cross-sectional views each illustrating the connecting member 60 and the connected member 70. As illustrated in FIG. 6B, FIG. 8, and FIG. 9, the pull-out type heating cooking apparatus 100 further includes a pair of connecting members 60 and a pair of connected members 70.

First, the pair of connecting members 60 will be described. The pair of connecting members 60 is attached to the lid portion 21. The connecting members 60, which are paired, face each other in the left-right direction. One connecting member of the pair of connecting members 60 is attached at an edge portion of the second face 211B of the lid portion 21 on the right side and above the placing portion 22. The other connecting member of the pair of connecting members 60 is attached at an edge portion of the second face 211B of the lid portion 21 on the left side and above the placing portion 22.

Specifically, each of the pair of connecting members 60 includes a hook member 61 and an elastic member 62.

The hook member 61 is a plate-like member having the front-rear direction as a longitudinal direction. The hook member 61 includes a claw portion 61*a* and a rotating pin portion 61*b*. The rotating pin portion 61*b* is positioned at one end portion of the hook member 61. The rotating pin portion 61*b* rotates about a rotation axis extending along the second direction D2. On the other hand, the claw portion 61*a* includes a protruding portion that protrudes downward. The claw portion 61*a* is positioned at the other end portion of the hook member 61. As a result, the claw portion 61*a* is rotatable around the rotating pin portion 61*b*.

The elastic member 62 acts on the hook member 61 such that the claw portion 61*a* is positioned at a predetermined position with respect to the second face 211B. The elastic member 62 is, for example, a coil spring. One end portion of the coil spring is attached to the hook member 61, and the other end portion of the coil spring is attached to the second face 2111B.

Next, the pair of connected members 70 will be described. The pair of connected members 70 is attached to the heating chamber 1. One connected member of the pair of connected members 70 is attached at an edge portion of the panel 50 of the heating chamber 1 on the right side and above the placing portion 22. Particularly, the one connected member is attached to the fifth through hole 55. The other connected member of the pair of connected members 70 is attached at an edge portion of the panel 50 of the heating chamber 1 on the left side and above the placing portion 22. Particularly, the other connected member is attached to the fourth through hole 54.

Specifically, the connected members 70 each include an inclined face portion 71, a hole portion 72, and two sensors 73. The inclined face portion 71 includes an inclined face gradually rising from a predetermined height. The hole portion 72 is positioned at a predetermined height and is positioned on the rear side of the inclined face portion 71. A shape of the hole portion 72 corresponds to a shape of the claw portion 61*a*. The two sensors 73 output signals to the control unit 5 when the claw portion 61*a* is positioned in the hole portion 72. On the other hand, the two sensors 73 output no signal to the control unit 5 when the claw portion 61*a* is not positioned in the hole portion 72.

Here, a connection method for connecting the heating chamber 1 and the lid portion 21 will be described in detail. First, as illustrated in FIG. 8, the drive motor 41 is driven to move the lid portion 21 from the open position to the closed position. That is, the distance between the panel 50 and the second face 211B decreases.

Next, when the distance between the panel 50 and the second face 211B decreases, the claw portion 61*a* comes into contact with the inclined face portion 71 of the connected member 70, and thus the claw portion 61*a* is pushed up from the predetermined position against the action of the elastic member 62.

Next, when the distance between the panel 50 and the second face 211B further decreases, the claw portion 61*a* is pulled down to the predetermined position by the action of the elastic member 62.

As a result, as illustrated in FIG. 9, the claw portion 61*a* is positioned in the hole portion 72. The distance between the panel 50 and the second face 211B is a predetermined distance. The two sensors 73 output signals to the control unit 5 when the claw portion 61*a* is positioned in the hole portion 72.

According to the pull-out type heating cooking apparatus 100, it is possible to keep the parallelism between the plate-like member 211 of the lid portion 21 and the panel 50 of the heating chamber 1 with accuracy, so that the claw portion 61*a* can be positioned in the hole portion 72 with accuracy in a case where the lid portion 21 is positioned at the closed position. As a result, the two sensors 73 can precisely output signals to the control unit 5.

Figure 10:
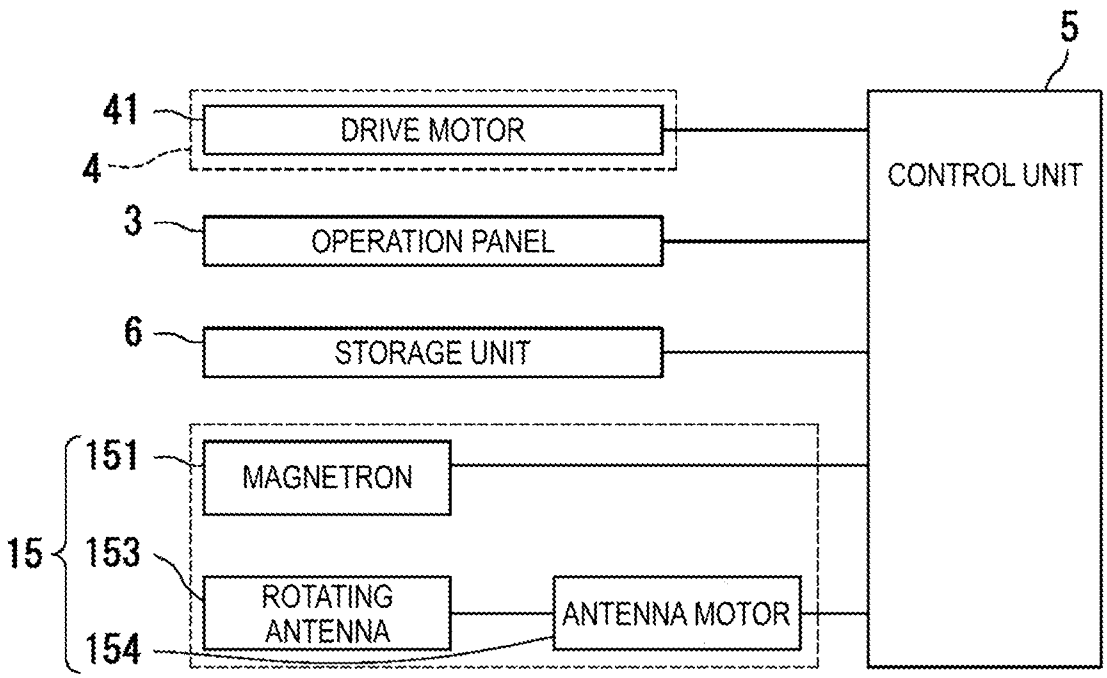
FIG. 10 is a block diagram illustrating a configuration of the pull-out type heating cooking apparatus according to the present embodiment.

A configuration of the pull-out type heating cooking apparatus 100 will be described in detail with reference to FIG. 10. FIG. 10 is a block diagram illustrating the configuration of the pull-out type heating cooking apparatus 100 according to the present embodiment.

As illustrated in FIG. 10, the control unit 5 controls a magnetron 151, an antenna motor 154, the drive motor 41, the operation panel 3, and the storage unit 6 by executing control programs stored in the storage unit 6.

The control unit 5 controls driving of the microwave supply unit 15. Particularly, the control unit 5 drives the magnetron 151 and the antenna motor 154 after receiving signals from the two sensors 73.

Figure 11:
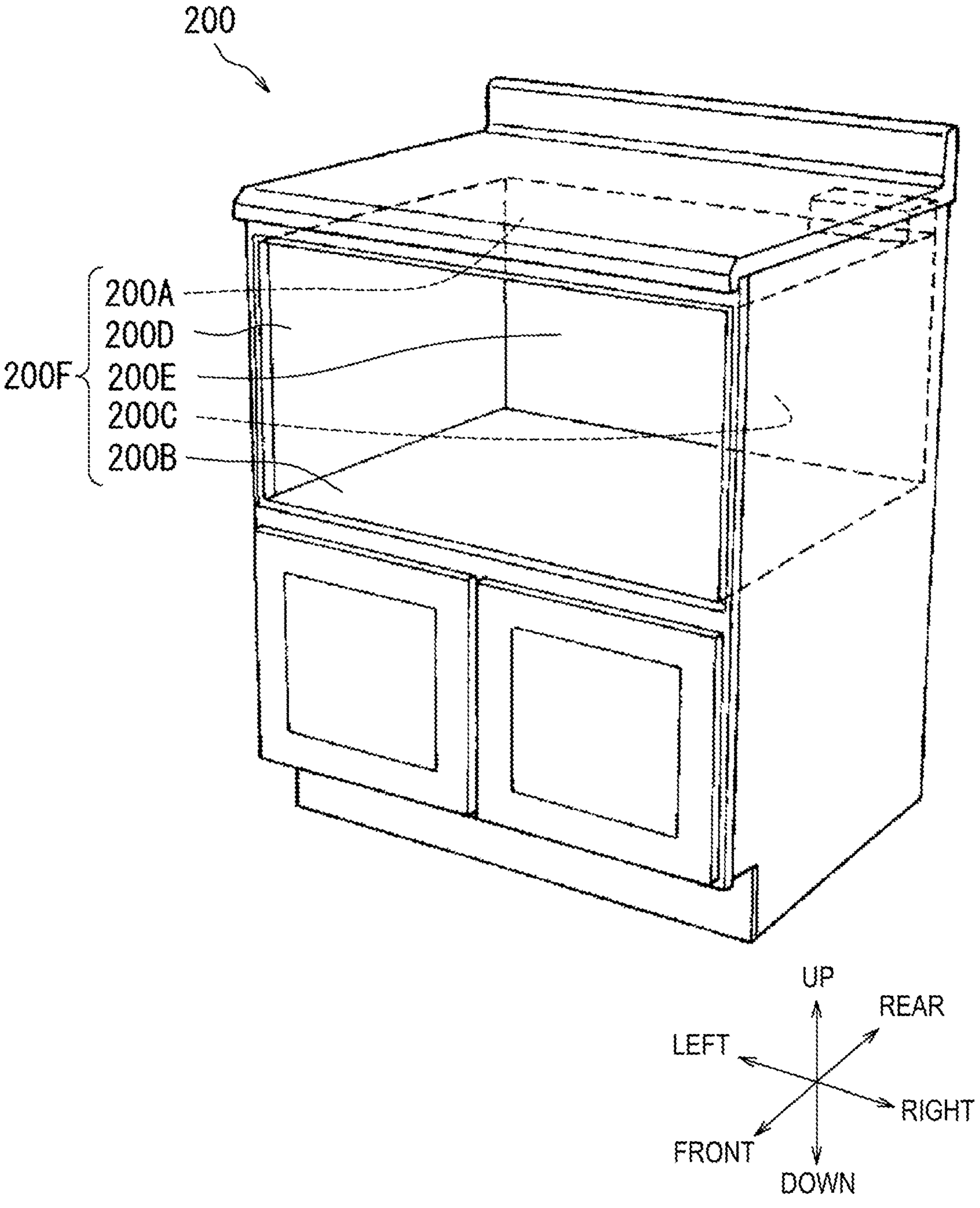
FIG. 11 is a perspective view illustrating a cabinet to which the pull-out type heating cooking apparatus according to the present embodiment is attached.

Subsequently, a cabinet 200 to which the pull-out type heating cooking apparatus 100 is attached will be described with reference to FIG. 11. FIG. 11 is a diagram illustrating an appearance of the cabinet 200 to which the pull-out type heating cooking apparatus 100 according to the present embodiment is attached.

The pull-out type heating cooking apparatus 100 is installed in the cabinet 200 in a built-in manner. As illustrated in FIG. 11, the cabinet 200 includes an upper wall 200A, a lower wall 200B, a right wall 200C, a left wall 200D, and a rear wall 200E. The upper wall 200A, the lower wall 200B, the right wall 200C, the left wall 200D, and the rear wall 200E form an accommodation portion 200F. The accommodation portion 200F is a rectangular parallelepiped space into which the pull-out type heating cooking apparatus 100 is fitted.

The embodiment of the present invention has been described above with reference to the accompanying drawings. However, the present invention is not limited to the embodiment described above, and the present invention can be implemented in various modes without departing from the gist thereof. The drawings primarily schematically illustrate each of the constituent elements for the sake of easier understanding, and the thickness, length, quantity, and the like of each of the illustrated constituent elements are different from the actual thickness, length, quantity, and the like by reason of creation of the drawings. Further, the material, shape, dimensions, and the like of each of the constituent elements illustrated in the embodiment described above are merely examples and are not particularly limited, and various modifications can be made within the scope not substantially departing from the effects of the present invention.

(1) As described with reference to FIG. 1 to FIG. 11, the pull-out type heating cooking apparatus 100 includes the microwave supply unit 15, but the present invention is not limited thereto. For example, the pull-out type heating cooking apparatus 100 may further include an air sending unit that blows hot air into the heating cooking chamber 100A.

(2) The pull-out type heating cooking apparatus 100 may further include a grill heater.

INDUSTRIAL APPLICABILITY

The present invention provides a heating cooking apparatus, and the provided heating cooking apparatus has industrial applicability.

REFERENCE SIGNS LIST

1 Heating chamber (housing)
11 Rail member
21 Lid portion
24 Slide member
100 Pull-out type heating cooking apparatus
100A Heating cooking chamber
100B Opening portion (opening)
211 Plate-like member
211A First face
211B Second face
251 Main body portion
252 Protruding portion
D1 First direction

The invention claimed is:

1. A heating cooking apparatus comprising:

a housing including an opening, opened toward a first direction, and an outer peripheral portion disposed on an outer periphery of the opening;

a lid portion including a metal plate that is configured to open and close the opening;

a guide rail disposed in the housing and extending in the first direction;

a slide rail disposed on the lid portion and extending from the lid portion in a direction opposite to the first direction; and a hook attached to the lid portion to hook an upper portion of the lid portion to the housing when the lid portion closes the opening, wherein the metal plate includes a first face facing the first direction and a second face facing the direction opposite to the first direction, the slide rail includes:

a main body portion configured to move relative to the guide rail, and a protruding portion protruding upward from an end portion of the main body portion on a metal plate side, the hook is disposed above the slide rail, and the protruding portion abuts against the first face of the metal plate from the direction opposite to the first direction.

2. The heating cooking apparatus according to claim 1, wherein the metal plate further includes a through hole penetrating along the first direction, and the end portion of the main body portion on the metal plate side is inserted into the through hole.

3. The heating cooking apparatus according to claim 2, wherein the through hole is disposed in the metal plate in such a manner that a weight of the lid portion above the through hole and a weight of the lid portion below the through hole are substantially identical.

4. The heating cooking apparatus according to claim 1, further comprising:

a screw extending in a second direction intersecting the first direction, wherein the second direction is substantially orthogonal to the first direction and substantially orthogonal to an up-down direction, the metal plate further includes an extension portion extending from the second face in the direction opposite to the first direction, and the screw fixes the end portion of the main body portion on the metal plate side to the extension portion.

5. The heating cooking apparatus according to claim 1, further comprising:

a heating cooking chamber accommodated in the housing and communicating with the opening; and a microwave supply unit configured to supply microwaves into the heating cooking chamber, wherein a distance between the metal plate and the outer peripheral portion is a predetermined distance when the metal plate is positioned at a closed position at which the metal plate closes the opening.

6. The heating cooking apparatus according to claim 5, wherein the guide rail comprises a pair of guide rails, the slide rail comprises a pair of slide rails, and the pair of guide rails and the pair of slide rails are disposed between the housing and the heating cooking chamber.

* * * * *